US012812420B2

(12) United States Patent
Gray et al.

(10) Patent No.: US 12,812,420 B2
(45) Date of Patent: Nov. 24, 2026

(54) SYSTEMS AND METHODS FOR AUTOMATICALLY TESTING A WIRELESS CONNECTION

(71) Applicant: Communications Test Design, Inc., West Chester, PA (US)

(72) Inventors: Russell Gray, Surprise, AZ (US); Christopher Flores, Avondale, AZ (US)

(73) Assignee: Communications Test Design, Inc., West Chester, PA (US)

( * ) Notice: Subject to any disclaimer, the term of this patent is extended or adjusted under 35 U.S.C. 154(b) by 260 days.

(21) Appl. No.: 18/724,218

(22) PCT Filed: Jan. 25, 2023

(86) PCT No.: PCT/US2023/011521
§ 371 (c)(1),
(2) Date: Jun. 26, 2024

(87) PCT Pub. No.: WO2023/146898
PCT Pub. Date: Aug. 3, 2023

(65) Prior Publication Data

US 2025/0227519 A1 Jul. 10, 2025

Related U.S. Application Data

(60) Provisional application No. 63/302,751, filed on Jan. 25, 2022.

(51) Int. Cl.
*H04W 24/06* (2009.01)
*G06F 3/0482* (2013.01)

(52) U.S. Cl.
CPC .......... *H04W 24/06* (2013.01); *G06F 3/0482* (2013.01)

(58) Field of Classification Search
CPC ..... H04W 24/02; H04W 24/06; H04W 84/02; H04W 84/10; H04W 84/12; H04W 84/14;
(Continued)

(56) References Cited

U.S. PATENT DOCUMENTS

2004/0003060 A1 1/2004 Asoh et al.
2008/0013487 A1 * 1/2008 Molteni ................ H04L 63/029 370/329

(Continued)

FOREIGN PATENT DOCUMENTS

CN 101008892 A 8/2007
CN 101834854 A * 9/2010

(Continued)

OTHER PUBLICATIONS

Extended European Search Report issued for European Patent Application No. 23747552.0 dated Dec. 17, 2025, 14 pages.

(Continued)

*Primary Examiner* — Mohamed A Kamara
(74) *Attorney, Agent, or Firm* — Duane Morris LLP

(57) ABSTRACT

Systems and methods for automatically testing wireless connections of network access points are disclosed according to various embodiments. In one example, a disclosed comprises: receiving a first input from a user via a graphic user interface (GUI); scanning, based on the first input, for available wireless networks to find a plurality of network identifications (IDs); filtering the plurality of network IDs to generate a subset of network IDs meeting a predetermined criterion; providing, to the user, the subset of network IDs representing a list of access points via the GUI; receiving a second input from the user, wherein the second input indicates that the user selects a network ID from the subset of network IDs; receiving a third input from the user via the GUI; performing, based on the third input, a wireless
(Continued)

connection test for a selected access point associated with the selected network ID to generate a connection test result; generating at least one label based on the connection test result; and providing, to the user, the at least one label via the GUI.

18 Claims, 5 Drawing Sheets

(58) Field of Classification Search
CPC ..... H04W 48/16; H04W 48/20; G06F 3/0482; H04L 43/08; H04L 43/50; H04L 41/12; H04L 41/22
See application file for complete search history.

(56) References Cited

U.S. PATENT DOCUMENTS

2008/0198811 A1* 8/2008 Deshpande ........... H04W 48/16 370/332
2010/0110921 A1 5/2010 Famolari et al.
2011/0286437 A1 11/2011 Austin et al.
2012/0230305 A1* 9/2012 Barbu ................... H04W 48/20 370/338
2014/0053246 A1 2/2014 Huang et al.
2015/0341211 A1* 11/2015 Saha .................... G05B 13/048 709/221
2017/0027005 A1 1/2017 Sung
2018/0035365 A1* 2/2018 Koratekere Honnappa ................ H04W 48/16
2019/0014021 A1 1/2019 Huang et al.
2020/0177485 A1 6/2020 Shurtleff et al.

FOREIGN PATENT DOCUMENTS

CN 101938764 A * 1/2011
CN 113660689 A * 11/2021 ............ H04W 24/06
KR 20130138534 A 12/2013

OTHER PUBLICATIONS

Office Action issued for Canadian Patent Application No. 3,242,189 dated Jun. 2, 2025, 4 pages.
International Search Report and Written Opinion for corresponding PCT International Application No. PCT/US2023/011521 dated Apr. 18, 2023, 10 pages.

* cited by examiner

SYSTEMS AND METHODS FOR AUTOMATICALLY TESTING A WIRELESS CONNECTION

CROSS-REFERENCE TO RELATED APPLICATIONS

This application is a National Stage Application, filed under 35 U.S.C. 371, of International Patent Application No. PCT/US2023/011521, filed on 25 Jan. 2023, which claims priority to U.S. Provisional Application No. 63/302,751 filed 25 Jan. 2022, entitled "Systems and Methods for Automatically Testing a Wireless Connection", incorporates herein by reference the entirety of the aforementioned provisional application the entireties of which are incorporated herein by reference.

FIELD

The present disclosure generally relates to systems and methods for testing a wireless connection, and more specifically, to systems and methods for automatically testing a wireless connection of an access point filtered from a plurality of access points.

BACKGROUND

Many devices nowadays can support wireless connections based on, e.g. Wi-Fi, Zigbee, etc. A network device, e.g. an Internet of Thing (IoT) device, a Wi-Fi point of delivery (POD), needs to be tested to determine its wireless connectivity. A manual wireless connection test requires manually going through all network identifications (IDs) being broadcast, to find the right one for a current device being tested, and connecting to it manually by typing a ping message via a command prompt to verify the wireless connectivity of the device being tested. In a situation when thousands of network devices need to be tested, e.g. for verification, amendment, or refurbishment, existing method based on manually connecting and sending pings to each network device would take too long to make the test process cost effective.

SUMMARY

An object of the present disclosure, among others, is to provide systems and methods to automatically test wireless connections of network access points.

In one embodiment, a method, implemented by at least one processor and at least one memory, for automatically testing wireless connections is disclosed. The method comprises: receiving a first input from a user via a graphic user interface (GUI); scanning, based on the first input, for available wireless networks to find a plurality of network identifications (IDs); filtering the plurality of network IDs to generate a subset of network IDs meeting a predetermined criterion; providing, to the user, the subset of network IDs representing a list of access points via the GUI; receiving a second input from the user, wherein the second input indicates that the user selects a network ID from the subset of network IDs; receiving a third input from the user via the GUI; performing, based on the third input, a wireless connection test for a selected access point associated with the selected network ID to generate a connection test result; generating at least one label based on the connection test result; and providing, to the user, the at least one label via the GUI.

In another embodiment, a system for automatically testing wireless connections is disclosed. The system comprises: a plurality of access points, each of which is broadcasting a network identification (ID); a computer comprising at least one processor and at least one memory. The at least one processor is configured to: receive a first input from a user via a graphic user interface (GUI) of the computer; scan, based on the first input, for available wireless networks to find a plurality of network IDs broadcasted by the plurality of access points; filter the plurality of network IDs to generate a subset of network IDs meeting a predetermined criterion; provide, to the user, the subset of network IDs representing a list of access points via the GUI; receive a second input from the user, wherein the second input indicates that the user selects a network ID from the subset of network IDs; receive a third input from the user via the GUI; perform, based on the third input, a wireless connection test for a selected access point associated with the selected network ID to generate a connection test result; generate at least one label based on the connection test result; and provide, to the user, the at least one label via the GUI.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Figure 1:
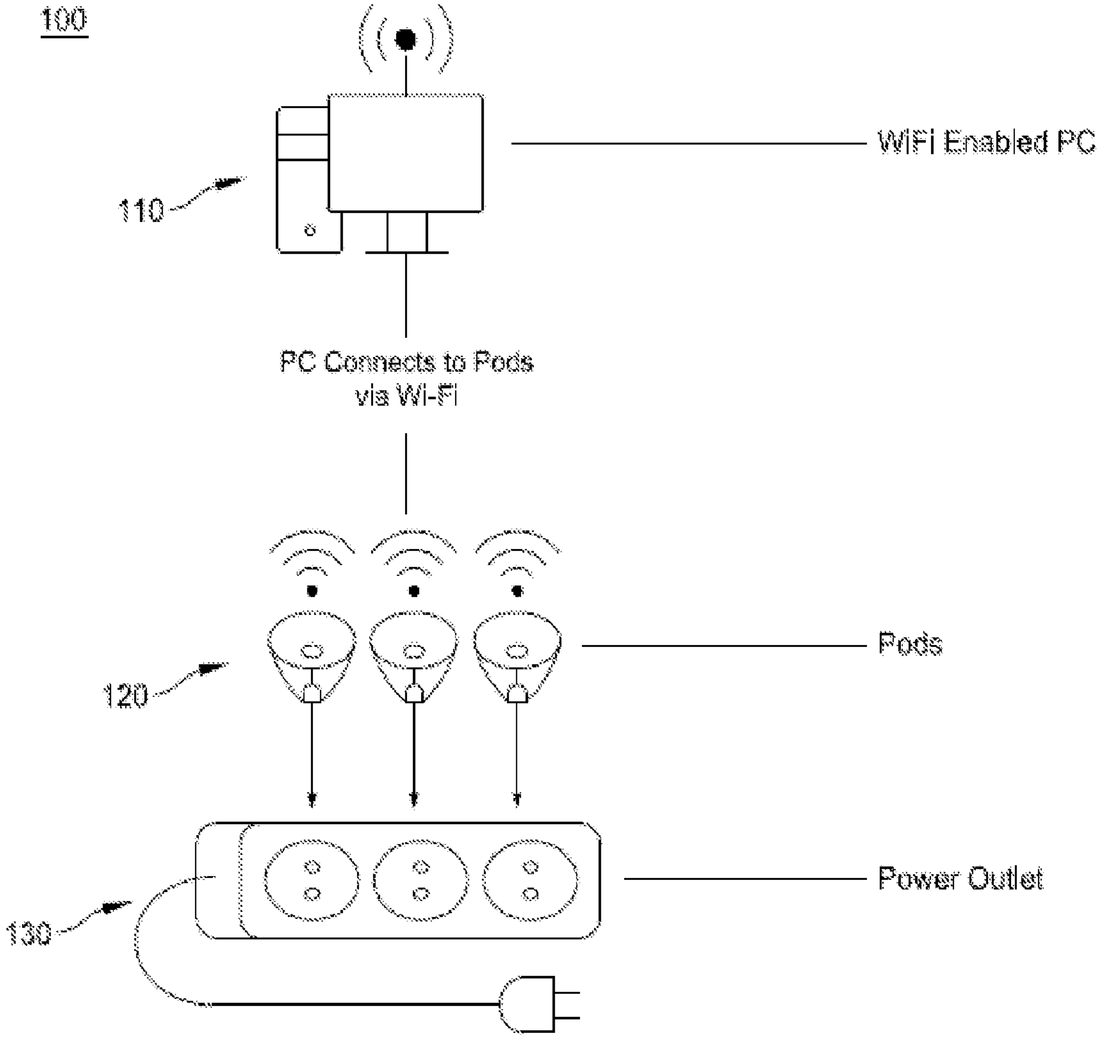
FIG. 1 is a diagram of an exemplary system for automatically testing wireless connections, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

A test for wireless connection of a network device is needed for fixing or refurbishing the network device. A manual wireless connection test requires manually connecting and sending a ping to the network device. First, a user gets a list of available wireless networks or access points when clicking on a network icon on the computer. For an in-house testing of network devices, the user would get hundreds or even thousands of access points in the list, which would make it very difficult for the user to find the correct one device to be tested. In addition, the user needs to click a connect button and enter the device's password, to connect to the network device. After the connection, the user also needs to find the gateway Internet Protocol (IP) address, e.g. by clicking through "Network Connections"→"Wi-Fi Status"→"Network Connection Details" under a Windows operation system. Then, the user has to open up a command prompt, and type in a ping message with the gateway IP address. After all of these manual operations, the user can finally verify the wireless connectivity of the network device based on the ping result shown in the command prompt. Throughout the disclosure, the term "click" or "clicking" on a button is used to mean an activation of a function associated with the button, which can include but not limited to: a click on a button by a computer mouse, a press on a button by a finger, a tap on a button by a stylus pen, etc.

Since developing an automated or semi-automated testing is critical for an in-house testing project to be profitable, one purpose of the present teaching is to simplify wireless connectivity testing for network devices. Various embodiments of the present disclosure provide methods and systems for automatically testing wireless connections of network devices, including a Wi-Fi point of delivery (POD) used in smart home security systems. A Wi-Fi POD may be an IoT smart device or hub to extend Wi-Fi network to cover various Wi-Fi and/or Zigbee devices at home. The Wi-Fi POD can connect to Wi-Fi and/or Zigbee devices, e.g. door sensors, window sensors, motion sensors, etc. A wireless connectivity of a Wi-Fi POD should be tested, for fixing some issue, firmware update, refurbishment, etc., especially when a POD model has been discontinued by its manufacturer.

Each network device is broadcasting a network ID, e.g. a Wi-Fi service set identifier (SSID). When a Wi-Fi POD is being tested or when its firmware is updated, its SSID needs to be discovered for a Wi-Fi connection test. In some embodiments, an app or testing software is used to filter out all SSID's discovered that are not from the Wi-Fi PODs. The app is running on a test computer to scan for open Wi-Fi networks to look for specific devices whose SSIDs meeting certain criteria, which allows the operator to be able to test these devices. This enables an automatic way to test network devices.

FIG. 1 is a diagram of an exemplary system 100 for automatically testing wireless connections, in accordance with some embodiments of the present disclosure. The system 100, as shown in FIG. 1, comprises a test computer 110, a plurality of unit under test (UUT) devices 120, and a power supply 130. The power supply 130 is configured for providing direct current (DC) or alternating current (AC) electric power to the UUT 120.

The test computer 110 in this example may be any computer including at least one processor and at least one memory storing a test application (app) or test software. Examples of the test computer 110 may include a personal computer (PC), laptop, tablet, smartphone, etc. The test computer 110 has Wi-Fi functionality enabled, e.g. by at least one Wi-Fi adapter.

The UUT devices 120 in this example can be any device to be tested. For example, the UUT devices 120 may be any network device supporting Wi-Fi or Zigbee connection. In some embodiments, each of the UUT devices 120 is a Wi-Fi POD to be tested. After plugging in each Wi-Fi POD into a power outlet of the power supply 130, the Wi-Fi POD may be reset to broadcast its network ID, which may be a unique Wi-Fi SSID. As shown in FIG. 1, the test computer 110 may be connected to one of the UUT devices 120 via Wi-Fi. In some embodiments, the test application running on the test computer 110 can communicate with the UUT devices 120 and provide a graphical user interface (GUI) which is what a user or technician can interact with.

In some embodiments, instead of manually looking for a specific Wi-Fi SSID and running a ping test, an app or testing software is used on the test computer 110 to automatically run a Wi-Fi connection test, based on user inputs received via the GUI of the test computer 110. In some embodiments, the app may be written in C# language.

The operation is simple for the user based on the app. Once the devices 120 are powered on, the app will automatically search for the SSID's broadcasted by the devices 120, filter the SSID's to find only a subset of SSID's that meet certain criteria, and display the found subset of SSID's, representing a list of network devices, via the GUI to the user. All of these operations are performed automatically by the app on the test computer 110, either based on a predetermined auto setup by the user, or based on one button click from the user. For example, based on certain criteria, the list of network devices include merely Wi-Fi PODs produced by a certain company, of a certain type, or under a certain brand. As such, the list would not be long.

Then, the user may click on one of the listed network devices to highlight its selection, and click a connect button via the GUI. Accordingly, the app will attempt to connect to that POD's Wi-Fi, and upon successful connection, will send a ping to verify a two-way communication with the POD.

In some embodiments, the test application running on the test computer 110 may be designed to test any network device broadcasting a wireless network ID.

Figure 2A:
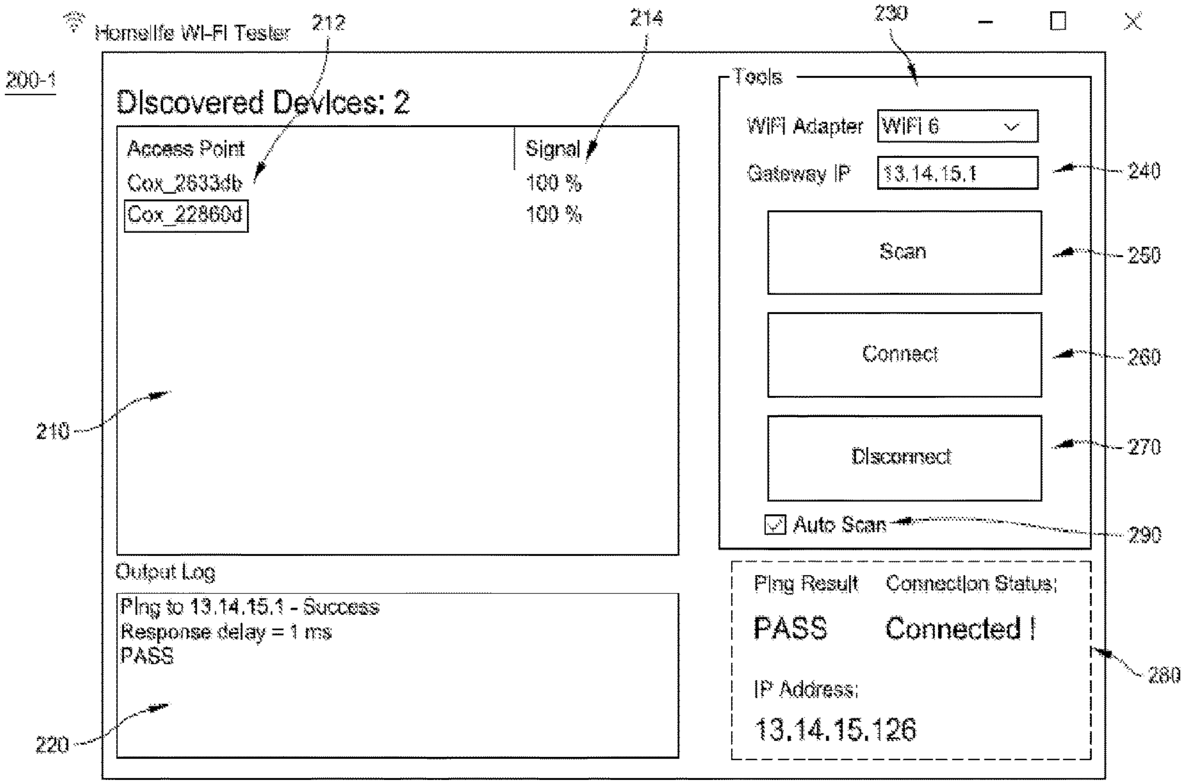
FIGS. 2A and 2B show an exemplary graphical user interface (GUI) of a system for automatically testing wireless connections, in accordance with some embodiments of the present disclosure.
Figure 2B:
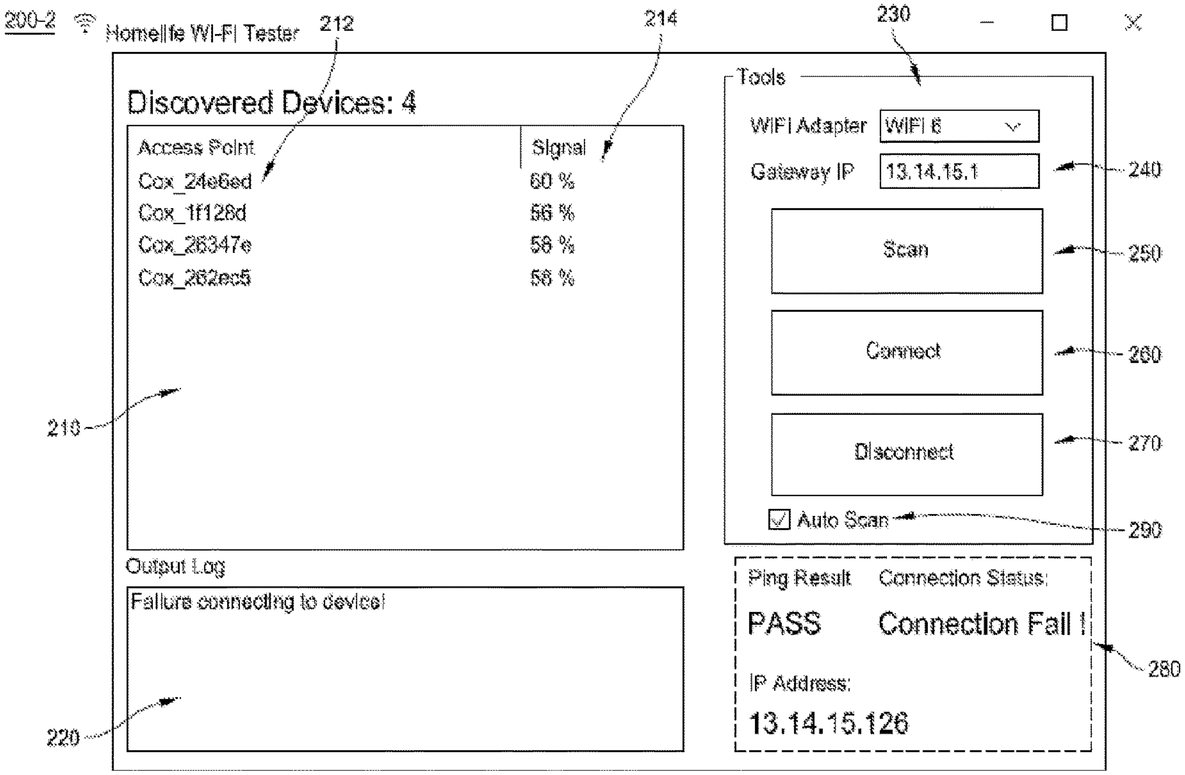

FIGS. 2A and 2B show an exemplary graphical user interface (GUI) 200 of a system for automatically testing wireless connections, in accordance with some embodiments of the present disclosure. In some embodiments, the GUI 200 may be of a system implemented by a test computer 110 as shown in FIG. 1. As shown in FIG. 2A, the GUI 200-1 includes various components.

As shown in FIG. 2A, the GUI 200-1 includes a scan button 250, which, when clicked by a user, is configured to trigger scanning for available wireless networks. For example, after the user clicks on the scan button 250, a first input is received by the test computer. Based on the first input, the test computer will scan for available wireless networks to find a plurality of network IDs; automatically filtering the plurality of network IDs to generate a subset of network IDs meeting a predetermined criterion; and providing, to the user, the subset of network IDs representing a list of access points via the GUI 200-1.

According to various embodiments, the predetermined criterion includes at least one of: the subset of network IDs includes all network IDs starting with a same predetermined prefix among the plurality of network IDs; the subset of network IDs includes all network IDs ending with a same predetermined suffix among the plurality of network IDs; or the subset of network IDs includes all network IDs containing a same predetermined word or phrase among the plurality of network IDs.

In the example shown in FIG. 2A, each of the plurality of network IDs is a Wi-Fi service set identifier (SSID); and each access point is broadcasting a respective SSID. In this example, the system is interested in testing a specific group of access points, each of which is a Wi-Fi extender device that is capable of extending Wi-Fi coverage and connecting to different Wi-Fi devices of a home security system. As such, among many SSID's discovered by the scanning, the test computer filters the SSID's discovered to find SSID's starting with a prefix "Cox_", which means a certain type of Wi-Fi PODs or extenders interested by the system or the user. This prefix can be predetermined by the operator or the user, e.g. based on a testing requirement. This can significantly reduce the number of access points in the list, which makes it easier for the user to find a specific device to test.

As shown in FIG. 2A, the system displays the filtered SSID's starting with the prefix "Cox_" in a first pane 210. The first pane 210 includes a list of access points 212 discovered and filtered based on the scanning, wherein each of the list of access points is represented by its network ID (or SSID) and is associated with a respective signal strength 214 shown in the first pane 210 as well.

In some embodiments, the test app running on the test computer instructs the test computer to perform the following based on the user's click on the scan button 250: scan for SSID's on the selected wireless network adapter; store all discovered SSID's in a list variable; loop through all SSID's discovered, to populate a list of access points with SSID's starting with "Cox_" and populate signal strength for SSID's starting with "Cox_".

In the example shown in FIG. 2A, the system discovered two devices whose SSID's starting with the prefix "Cox_": "Cox_2633db" and "Cox_22860d." Based on the displayed SSID's in the first pane 210, the user may click on one of the SSID's to select a corresponding access point for wireless connection test. In the example shown in FIG. 2A, the test computer receives a second input from the user, based on a click by the user on the network ID "Cox_22860d," which indicates that the user selects the access point having SSID "Cox_22860d" for connection test. The term "Cox_22860d" is as such highlighted accordingly in FIG. 2A.

Then, the user may click a connect button 260 located below the scan button 250 in the GUI 200-1, to start a wireless connection test for the selected access point. Accordingly, the test computer can receive a third input based on the click on a connection button in the GUI 200-1 by the user. Based on the third input, the system can perform a wireless connection test for the selected access point associated with the selected network ID "Cox_22860d" to generate a connection test result; automatically generate at least one label based on the connection test result; and provide, to the user, the at least one label via the GUI 200-1.

In some embodiments, performing the wireless connection test comprises: initiating, based on the third input, a wireless connection to the selected access point associated with SSID "Cox_22860d"; and upon a successful wireless connection to the selected access point, sending a ping test to a gateway address of the selected access point to generate a ping result, wherein the at least one label is generated based on the ping result. In the example shown in FIG. 2A, the gateway IP address 240 of the selected access point is shown above the scan button 250. The gateway IP address 240 may be the same for the list of access points in the first pane 210. In some embodiments, the gateway IP address 240 may not be displayed in the GUI 200-1. In some embodiments, initiating the wireless connection to the selected access point comprises automatically entering a password by the test computer for the selected access point when needed.

As shown in FIG. 2A, the GUI 200-1 further includes a drop-down list 230 of wireless network adapters located above the gateway IP address 240. The available wireless networks are scanned based on one of the wireless network adapters, which is selected by default or by the user.

The ping result may be shown in a second pane 220 that is located below the first pane 210 in the GUI 200-1. The second pane 220 shows log data from the ping test. The log data may include: an indication indicating whether a ping message is successfully received, a response delay time of the ping test, and/or an indication indicating whether the ping result is a pass or fail.

For easy and fast understanding by the user, the test computer generates the at least one label based on the ping result data, and displays the at least one label in a label section 280 in the GUI 200-1. In some embodiments, the at least one label may include: a first label showing an Internet Protocol (IP) address with respect to the selected access point; a second label showing a connection status indicating whether the selected access point is connected or not; and a third label showing a ping result summary indicating whether the ping test is a pass or fail. In the example shown in FIG. 2A, the connection status in the second label indicates that the selected access point is connected; the IP address in the first label is an IP address assigned by the selected access point to the test computer; and the ping result summary in the third label indicates that the ping test is a pass.

In some embodiments, the test app running on the test computer instructs the test computer to perform the following based on the user's click on the connect button 260: initiate Wi-Fi connection to a selected SSID in the list; upon successful connection, send a Ping (via .NET ping) to the connected network's gateway address; gather ping results in the second pane 220; and based on the Ping result, populate the labels with data from the ping test.

The click on the connect button 260 triggers the following: establishing a handshake connection between the test computer and the selected device; and sending a ping test to the gateway IP address. If the connect button 260 is clicked without selecting any device, the GUI 200-1 can show a message to instruct the user to select a device to connect.

In some embodiments, if the ping test passed and the connection is successful, the user can perform other steps for amendment or refurbishment. In some embodiments, if the ping test failed or the connection failed, the user can unplug the device, reset it again, and try the connection test again. If the device failed twice, the user may count it as a connection failure.

As shown in FIG. 2A, the GUI 200-1 further includes a disconnect button 270 located below the connect button 260 and configured for disconnecting from a currently connected access point. After the user clicks on the disconnect button 270, the test computer may receive a fourth input, based on which the test computer can disconnect wireless connection from the selected access point.

As shown in FIG. 2A, the GUI 200-1 further includes a checkbox 290 for auto scan. The checkbox 290 is located below the disconnect button 270. If the user checks the checkbox 290 via the GUI 200-1, the test computer can receive a fifth input, based on which the test computer will scan and filter network IDs automatically and periodically to update the list of access points in the first pane 210. For example, the test computer may scan every 5 seconds to update the list.

The GUI 200-2 shown in FIG. 2B is similar to the GUI 200-1 in FIG. 2A, except that in the label section 280 in the GUI 200-2: the connection status in the second label indicates that the connection to the selected access point failed. Therefore, there is no data shown in the ping result summary; and the output log in the second pane 220 also shows a failure connecting to device. In some embodiments as shown in FIG. 2B, there is a successful handshake between the selected device and the test computer. The device successfully provided an IP address for the test computer, but failed to reply to a ping test, which triggers the "Connection Fail!" displayed in the label section 280.

The disclosed systems and methods enable automatically looking for network devices that are on the Wi-Fi band and meet some certain criteria. For example, only the devices whose SSID starting, ending or containing a predetermined word or phrase will show up in the list in the first pane 210. This keeps the operator from having to find the device from thousands of network devices, which makes the job simple enough for the operator. For example, the operator can plug in dozens or even hundreds of devices at once. By clicking on the scan button, the system automatically finds the device(s) the operator wants to test. The operator can choose a device and click the connect button, which will take care of the ping test, and automatically connect to the Wi-Fi network and enter the password for the device, such that the operator does not have to do any of that manually. In some embodiments, this automatic test process takes about 20 seconds per connection test of a device, compared to 3-4 minutes for a manual test process.

Figure 3:
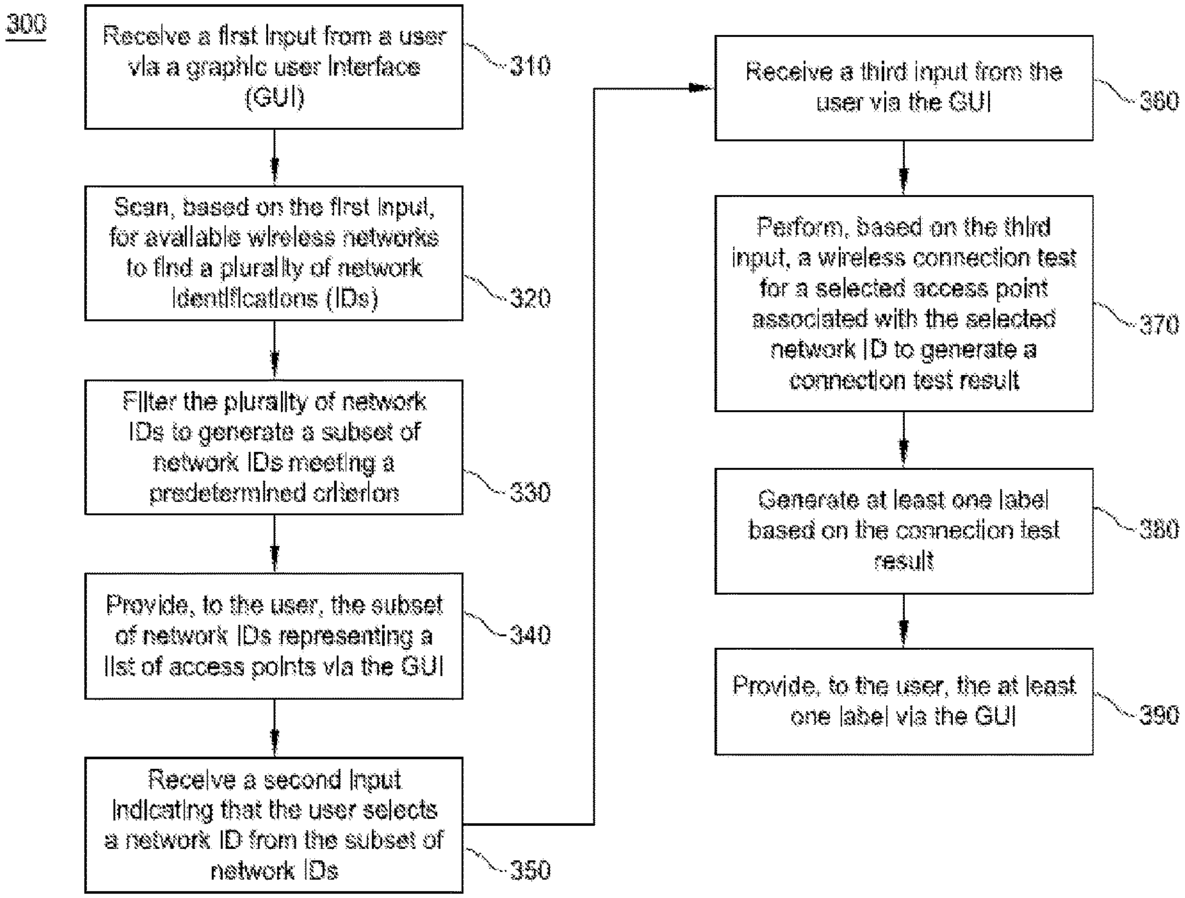
FIG. 3 is a flow chart showing an exemplary method for automatically testing wireless connections, in accordance with some embodiments of the present disclosure.

FIG. 3 is a flow chart showing an exemplary method 300 for automatically testing wireless connections, in accordance with some embodiments of the present disclosure. In some embodiments, the method 300 may be implemented via the test application running on the test computer 110, to test wireless connections of network devices 120.

As shown in FIG. 3, the method 300 starts from operation 310, where a first input is received from a user via a graphic user interface (GUI), which may be the GUI 200-1 in FIG. 2A or GUI 200-2 in FIG. 2B. Then at operation 320, the test computer can scan, based on the first input, for available wireless networks to find a plurality of network identifications (IDs). Then at operation 330, the test computer may filter the plurality of network IDs to generate a subset of network IDs meeting a predetermined criterion. For example, the predetermined criterion indicates that only network IDs starting with a certain prefix can be added to the subset. In this manner, only related network IDs interesting to the user are added to the list, which saves the user time to find the correct or right one device to test.

Then at operation 340, the test computer may provide, to the user, the subset of network IDs representing a list of access points via the GUI. At operation 350, the test computer may receive a second input indicating that the user selects a network ID from the subset of network IDs. At operation 360, the test computer may receive a third input from the user via the GUI. At operation 370, the test computer may perform, based on the third input, a wireless connection test for a selected access point associated with the selected network ID to generate a connection test result. At operation 380, the test computer may generate at least one label based on the connection test result. At operation 390, the test computer may provide, to the user, the at least one label via the GUI.

Figure 4:
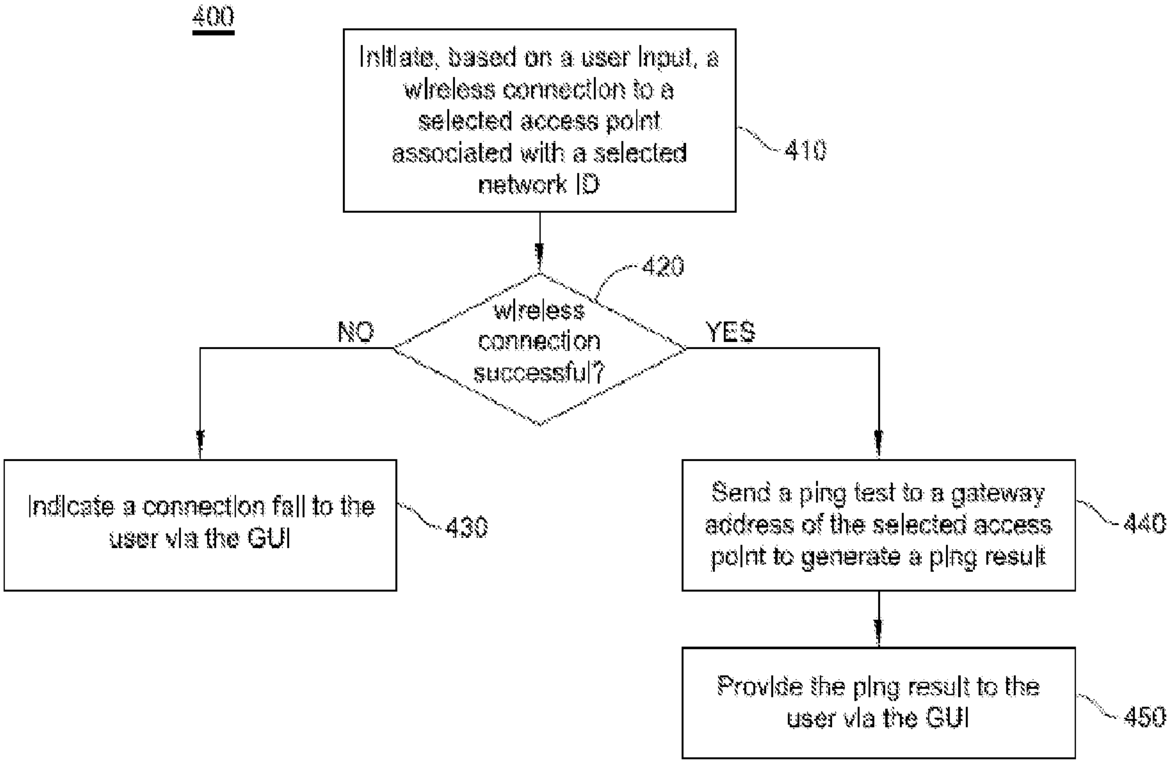
FIG. 4 is a flow chart showing an exemplary method for automatically performing a wireless connection test for a selected access point, in accordance with some embodiments of the present disclosure.

FIG. 4 is a flow chart showing an exemplary method 400 for automatically performing a wireless connection test for a selected access point, in accordance with some embodiments of the present disclosure. In one embodiment, the method 400 may be used to perform operation 370 in FIG. 3.

As shown in FIG. 4, the method 400 starts from operation 410, where the test computer initiates, based on a user input, a wireless connection to a selected access point associated with a selected network ID. In some embodiments, the user input may be the third input in FIG. 3; the selected access point associated with the selected network ID may be the same as what described in FIG. 3.

Then at operation 420, the test computer determines whether the wireless connection to the selected access point is successful or not. If so, the process goes to operation 440, where the test computer may send a ping test to a gateway address of the selected access point to generate a ping result; and the test computer may provide the ping result to the user via the GUI at operation 450. If not, the process goes to operation 430, where the test computer indicates a connection fail to the user via the GUI.

The order of the operations in FIG. 3 and FIG. 4 may be changed (or multiple operations happen at the same time) according to various embodiments of the present teaching.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Although examples are illustrated and described herein, embodiments are nevertheless not limited to the details shown, since various modifications and structural changes may be made therein by those of ordinary skill within the scope and range of equivalents of the claims.

The invention claimed is:

1. A method, implemented by at least one processor and at least one memory, for automatically testing wireless connections, comprising:

receiving a first input from a user via a graphic user interface (GUI);

scanning, based on the first input, for available wireless networks to find a plurality of network identifications (IDs);

filtering the plurality of network IDs to generate a subset of network IDs meeting a predetermined criterion;

providing, to the user, the subset of network IDs representing a list of access points via the GUI;

receiving a second input from the user, wherein the second input indicates that the user selects a network ID from the subset of network IDs;

receiving a third input from the user via the GUI;

in response to receiving the third input, automatically initiating, by the at least one processor and without additional user interaction, a wireless connection test for a selected access point associated with the selected network ID to generate a connection test result;

determining, based on the connection test result, at least one connection performance metric associated with the selected access point;

generating at least one label that classifies the selected access point according to connection quality based on the at least one connection performance metric; and providing, to the user, the at least one label via the GUI by dynamically updating the list of access points to display the label in association with the selected network ID while the subset of network IDs remains displayed.

2. The method of claim 1, wherein the predetermined criterion includes at least one of:

the subset of network IDs includes all network IDs starting with a same predetermined prefix among the plurality of network IDs;

the subset of network IDs includes all network IDs ending with a same predetermined suffix among the plurality of network IDs; and the subset of network IDs includes all network IDs containing a same predetermined word or phrase among the plurality of network IDs.

3. The method of claim 1, wherein performing the wireless connection test comprises:

initiating, based on the third input, a wireless connection to a selected access point associated with the selected network ID; and upon a successful wireless connection to the selected access point, sending a ping test to a gateway address of the selected access point to generate a ping result, wherein the at least one label is generated based on the ping result.

4. The method of claim 3, wherein initiating the wireless connection to the selected access point comprises entering a password for the selected access point when needed.

5. The method of claim 3, wherein the at least one label comprises:

a first label showing an Internet Protocol (IP) address with respect to the selected access point;

a second label showing a connection status indicating whether the selected access point is connected or not; and a third label showing a ping result summary indicating whether the ping test is a pass or fail.

6. The method of claim 3, wherein the GUI comprises:

a first pane showing the list of access points discovered by the scanning, wherein each of the list of access points is represented by its network ID and is associated with a respective signal strength shown in the first pane as well; and a second pane that is located below the first pane and shows log data from the ping test, wherein the log data include:

an indication indicating whether a ping message is successfully received, a response delay time of the ping test, and an indication indicating whether the ping result is a pass or fail.

7. The method of claim 6, wherein the GUI further comprises:

a gateway Internet Protocol (IP) address for the subset of network IDs; and a drop-down list of wireless network adapters located above the gateway IP address, wherein the available wireless networks are scanned based on one of the wireless network adapters, which is selected by default or by the user.

8. The method of claim 1, wherein:

the first input is received based on a click on a first button in the GUI by the user;

the second input is received based on a click on the selected network ID from the subset of network IDs by the user; and the third input is received based on a click on a second button in the GUI by the user.

9. The method of claim 8, wherein:

the first button is a scan button for scanning for available wireless networks; and the second button is a connect button located below the first button and for starting the wireless connection test.

10. The method of claim 9, further comprising:

receiving a fourth input from the user via the GUI; and disconnecting, based on the fourth input, from the selected access point.

11. The method of claim 10, wherein:

the fourth input is received based on a click on a third button in the GUI by the user; and the third button is a disconnect button located below the second button and for disconnecting from a currently connected access point.

12. The method of claim 1, further comprising:

receiving a fifth input from the user via the GUI; and based on the fifth input, scanning and filtering network IDs automatically and periodically to update the list of access points, wherein the fifth input is received based on a check of a checkbox for auto scan in the GUI by the user.

13. The method of claim 1, wherein:

each of the plurality of network IDs is a Wi-Fi service set identifier (SSID);

each of the list of access points is a Wi-Fi extender device that is capable of extending Wi-Fi coverage and connecting to different Wi-Fi devices of a home security system; and each of the list of access points is broadcasting a respective SSID.

14. A system for automatically testing wireless connections, comprising:

a plurality of access points, each of which is broadcasting a network identification (ID);

a computer comprising at least one processor and at least one memory, wherein the at least one processor is configured to:

receive a first input from a user via a graphic user interface (GUI) of the computer;

scan, based on the first input, for available wireless networks to find a plurality of network IDs broadcasted by the plurality of access points;

filter the plurality of network IDs to generate a subset of network IDs meeting a predetermined criterion;

provide, to the user, the subset of network IDs representing a list of access points via the GUI;

receive a second input from the user, wherein the second input indicates that the user selects a network ID from the subset of network IDs;

receive a third input from the user via the GUI;

in response to the third input, automatically initiate, without additional user interaction, a wireless connection test for a selected access point associated with the selected network ID to generate a connection test result;

determine, based on the connection test result, at least one connection performance metric associated with the selected access point;

generate at least one label that classifies the selected access point according to connection quality based on the at least one connection performance metric; and provide, to the user, the at least one label via the GUI by dynamically updating the list of access points to display the label in association with the selected network ID while the subset of network IDs remains displayed.

15. The system of claim 14, wherein the predetermined criterion includes at least one of:

the subset of network IDs includes all network IDs starting with a same predetermined prefix among the plurality of network IDs;

the subset of network IDs includes all network IDs ending with a same predetermined suffix among the plurality of network IDs; or the subset of network IDs includes all network IDs containing a same predetermined word or phrase among the plurality of network IDs.

16. The system of claim 14, wherein the wireless connection test is performed based on:

initiating, based on the third input, a wireless connection to the selected access point associated with the selected network ID; and upon a successful wireless connection to the selected access point, sending a ping test to a gateway address of the selected access point to generate a ping result, wherein the at least one label is generated based on the ping result.

17. The system of claim 16, wherein initiating the wireless connection to the selected access point comprises entering a password for the selected access point when needed.

18. The system of claim 16, wherein the at least one label comprises:

a first label showing an Internet Protocol (IP) address with respect to the selected access point;

a second label showing a connection status indicating whether the selected access point is connected or not; and a third label showing a ping result summary indicating whether the ping test is a pass or fail.

* * * * *